United States Patent
Bangalore et al.

(10) Patent No.: US 9,501,470 B2
(45) Date of Patent: *Nov. 22, 2016

(54) SYSTEM AND METHOD FOR ENRICHING SPOKEN LANGUAGE TRANSLATION WITH DIALOG ACTS

(71) Applicant: AT&T Intellectual Property I, L.P., Reno, NV (US)

(72) Inventors: Srinivas Bangalore, Morristown, NJ (US); Vivek Kumar Rangarajan Sridhar, Goleta, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 478 days.

This patent is subject to a terminal disclaimer.

(21) Appl. No.: 13/761,549

(22) Filed: Feb. 7, 2013

(65) Prior Publication Data

US 2013/0151232 A1 Jun. 13, 2013

Related U.S. Application Data

(63) Continuation of application No. 12/324,388, filed on Nov. 26, 2008, now Pat. No. 8,374,881.

(51) Int. Cl.
*G06F 17/28* (2006.01)
*G06F 17/27* (2006.01)

(52) U.S. Cl.
CPC ............ *G06F 17/28* (2013.01); *G06F 17/279* (2013.01); *G06F 17/289* (2013.01)

(58) Field of Classification Search
CPC .. G06F 17/218; G06F 17/28; G06F 17/2818; G06F 17/2872; G06F 17/2881; G10L 15/18

USPC ............ 704/3, 4, 9, 231, 257, 277
See application file for complete search history.

(56) References Cited

U.S. PATENT DOCUMENTS

| | | |
|---|---|---|
| 5,930,746 A | 7/1999 | Ting |
| 5,983,184 A | 11/1999 | Noguchi |
| 5,991,710 A | 11/1999 | Papineni et al. |
| 6,115,686 A | 9/2000 | Chung et al. |
| 6,356,865 B1 * | 3/2002 | Franz et al. ............ 704/2 |
| 6,374,224 B1 | 4/2002 | Horiguchi et al. |

(Continued)

OTHER PUBLICATIONS

Sridhar et al., "Incorporation Discourse Context in Spoken Language Translation through Dialog Acts", Spoken Language Translation Technology Workshop, 2008, Dec. 15, 2008 to Dec. 19, 2008, pp. 269-272.

*Primary Examiner* — Martin Lerner

(57) ABSTRACT

Disclosed herein are systems, computer-implemented methods, and tangible computer-readable media for enriching spoken language translation with dialog acts. The method includes receiving a source speech signal, tagging dialog acts associated with the received source speech signal using a classification model, dialog acts being domain independent descriptions of an intended action a speaker carries out by uttering the source speech signal, producing an enriched hypothesis of the source speech signal incorporating the dialog act tags, and outputting a natural language response of the enriched hypothesis in a target language. Tags can be grouped into sets such as statement, acknowledgement, abandoned, agreement, question, appreciation, and other. The step of producing an enriched translation of the source speech signal uses a dialog act specific translation model containing a phrase translation table.

16 Claims, 4 Drawing Sheets

(56) References Cited

U.S. PATENT DOCUMENTS

| | | | |
|---|---|---|---|
| 6,810,378 B2 | 10/2004 | Kachanski et al. | |
| 7,191,132 B2 | 3/2007 | Brittan et al. | |
| 7,366,655 B1 | 4/2008 | Gupta et al. | |
| 7,487,093 B2 | 2/2009 | Mutsuno et al. | |
| 7,610,191 B2 | 10/2009 | Gao et al. | |
| 7,698,124 B2* | 4/2010 | Menezes | G06F 17/2818 704/2 |
| 7,912,696 B1 | 3/2011 | Asano et al. | |
| 7,979,280 B2 | 7/2011 | Wouters et al. | |
| 7,996,214 B2 | 8/2011 | Bangalore et al. | |
| 8,131,536 B2* | 3/2012 | Weischedel | G06F 17/2229 704/2 |
| 8,190,436 B2 | 5/2012 | Bangalore et al. | |
| 8,374,881 B2* | 2/2013 | Bangalore et al. | 704/277 |
| 8,849,665 B2* | 9/2014 | Bangalore | G06F 17/2827 704/10 |
| 8,954,319 B2* | 2/2015 | Williams | G06F 17/2881 704/257 |
| 8,972,268 B2* | 3/2015 | Waibel | G06F 17/2818 704/2 |
| 9,122,674 B1* | 9/2015 | Wong | G06F 17/28 |
| 2003/0040899 A1 | 2/2003 | Ogilvie | |
| 2003/0130841 A1 | 7/2003 | Bangalore et al. | |
| 2003/0182102 A1* | 9/2003 | Corston-Oliver | G06F 17/2881 704/9 |
| 2003/0191625 A1 | 10/2003 | Gorin et al. | |
| 2004/0193401 A1* | 9/2004 | Ringger | G06F 17/2881 704/9 |
| 2007/0005337 A1 | 1/2007 | Mount et al. | |
| 2008/0059147 A1 | 3/2008 | Afify et al. | |
| 2008/0154577 A1* | 6/2008 | Kim | G06F 17/2827 704/2 |
| 2008/0243474 A1 | 10/2008 | Furihata et al. | |
| 2008/0270109 A1* | 10/2008 | Och | G06F 17/2818 704/2 |
| 2008/0319736 A1* | 12/2008 | Toutanova | G06F 17/2818 704/9 |
| 2009/0055176 A1* | 2/2009 | Hu | G10L 15/08 704/240 |
| 2009/0106015 A1* | 4/2009 | Li | G06F 17/2818 704/2 |
| 2009/0119102 A1 | 5/2009 | Bangalore et al. | |
| 2009/0192781 A1* | 7/2009 | Bangalore | G06F 17/2827 704/2 |
| 2010/0082326 A1 | 4/2010 | Bangalore et al. | |
| 2010/0131274 A1 | 5/2010 | Stent et al. | |

* cited by examiner

FIG. 4

Source: آیا این مسکنه

Ref: is this a painkiller

Hyp: this is a painkiller

Enriched Hyp: this is a painkiller (Yes-No-Question)

SYSTEM AND METHOD FOR ENRICHING SPOKEN LANGUAGE TRANSLATION WITH DIALOG ACTS

CROSS-REFERENCE TO RELATED APPLICATIONS

This application is a continuation of U.S. patent application Ser. No. 12/324,388, filed Nov. 26, 2008, now U.S. Pat. No. 8,374,881, issued 12 Feb. 2013, which relates to U.S. Patent Application 20030130841 A1, titled "System and Method of Spoken Language Understanding in Human Computer Dialogs", filed Dec. 5, 2002, the contents of which are incorporated by reference.

BACKGROUND OF THE INVENTION

1. Field of the Invention

The present invention relates to automatic speech recognition and more specifically to recognizing and translating speech.

2. Introduction

Automatic speech processing has advanced significantly but is still largely compartmentalized. For instance, automatic speech recognition typically transcribes speech orthographically and hence insufficiently captures context beyond words. Enriched transcription combines automatic speech recognition, speaker identification and natural language processing with the goal of producing richly annotated speech transcriptions that are useful both to human readers and to automated programs for indexing, retrieval and analysis. Some examples of enriched transcription include punctuation detection, topic segmentation, disfluency detection and clean-up, semantic annotation, pitch accent, boundary tone detection, speaker segmentation, speaker recognition, and annotation of speaker attributes. These meta-level tags are an intermediate representation of the context of the utterance along with the content provided by the orthographical transcription.

Accordingly, what is needed in the art is an improved way to enrich automatic speech translation with information beyond the text to be translated.

SUMMARY

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Disclosed are systems, computer-implemented methods, and tangible computer-readable media for enriching spoken language translation with dialog acts. The method includes receiving a source speech signal, tagging dialog acts associated with the received source speech signal using a classification model (such as a maximum entropy model), dialog acts being domain independent or domain dependent descriptions of an intended action a speaker carries out by uttering the source speech signal, producing an enriched hypothesis of the source speech signal incorporating the dialog act tags, and outputting a natural language response of the enriched hypothesis in a target language. Tags can be grouped into sets such as statement, acknowledgement, abandoned, agreement, question, appreciation, and other. The step of producing an enriched translation of the source speech signal uses a translation model containing a dialog act specific phrase translation table. The method can further include appending to each phrase translation table belonging to a particular dialog act specific translation model those entries from a complete model that are not present in the phrase table of the dialog act specific translation model, and weighting appended entries by a factor $\alpha$. When the source speech signal is a dialog turn having multiple sentences, the method can further include segmenting the source speech signal, tagging dialog acts in each segment using a maximum entropy model, and producing an enriched translation of each segment in a target language incorporated with the dialog act tags. The method can further include annotating tagged dialog acts.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which:

FIG. 4 illustrates an example of speech translation output enriched with a dialog act.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
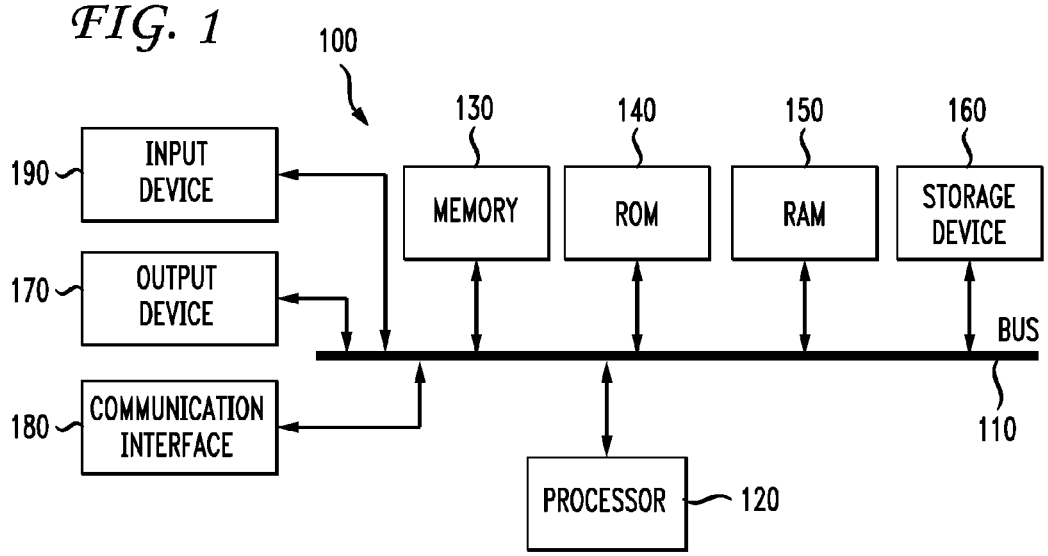
FIG. 1 illustrates an example system embodiment.

With reference to FIG. 1, an exemplary system includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. A processing unit 120 can include a general purpose CPU controlled by software as well as a special-purpose processor. An Intel Xeon LV L7345 processor is an example of a general purpose CPU which is controlled by software. Particular functionality may also be built into the design of a separate computer chip. An STMicroelectronics STA013 processor is an example of a special-purpose processor which decodes MP3 audio files. Of course, a processing unit includes any general purpose CPU and a module configured to control the CPU as well as a special-purpose processor where software is effectively incorporated into the actual processor design. A processing unit may essentially be a completely self-contained computing system, containing multiple cores or CPUs, a bus, memory controller, cache, etc. A multi-core processing unit may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. In one aspect, a hardware module that performs a particular function includes the software component stored in a tangible computer-readable medium in connection with the necessary hardware components, such as the CPU, bus, display, and so forth, to carry out the function. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The input may be used by the presenter to indicate the beginning of a speech search query. The output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software and hardware, such as a processor, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits.

Figure 2:
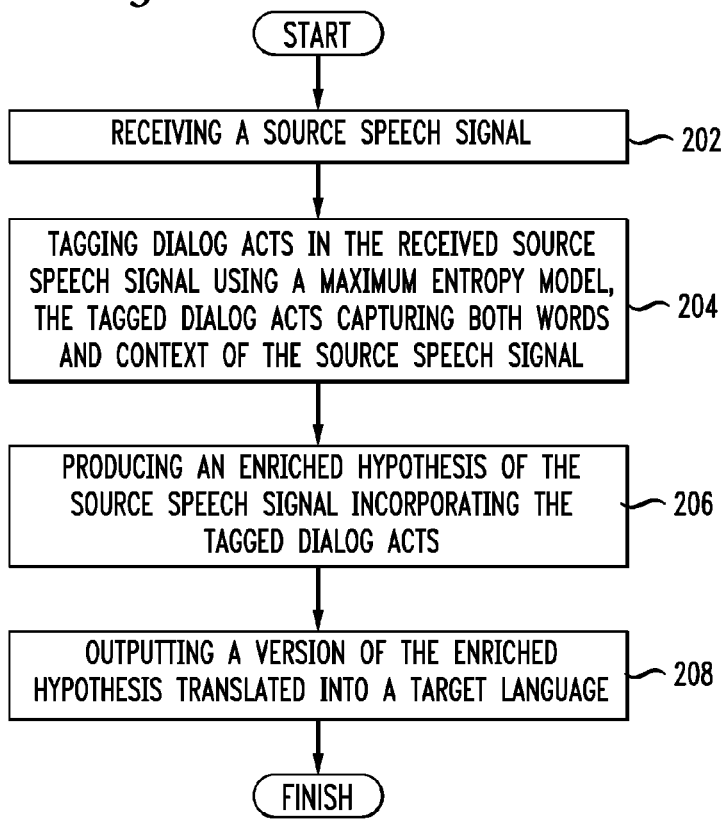
FIG. 2 illustrates an example method embodiment.

Having disclosed some fundamental system components, the disclosure turns to the example method embodiment as illustrated in FIG. 2. For simplicity, FIG. 2 is discussed in terms of a system configured to practice the method by translating a source signal into a target language using dialog act tags.

The system first receives a source speech signal (202). The system accepts a source speech signal as a telephone call, as a digitally encoded file, an analog audio stream, a set of packets such as a Voice over IP (VoIP) call, or other actual speech signal or representation of a speech signal. The speech signal can be altered or preprocessed such as by a noise removal process. The speech signal may be part of a larger user-system natural language dialog.

Figure 5:
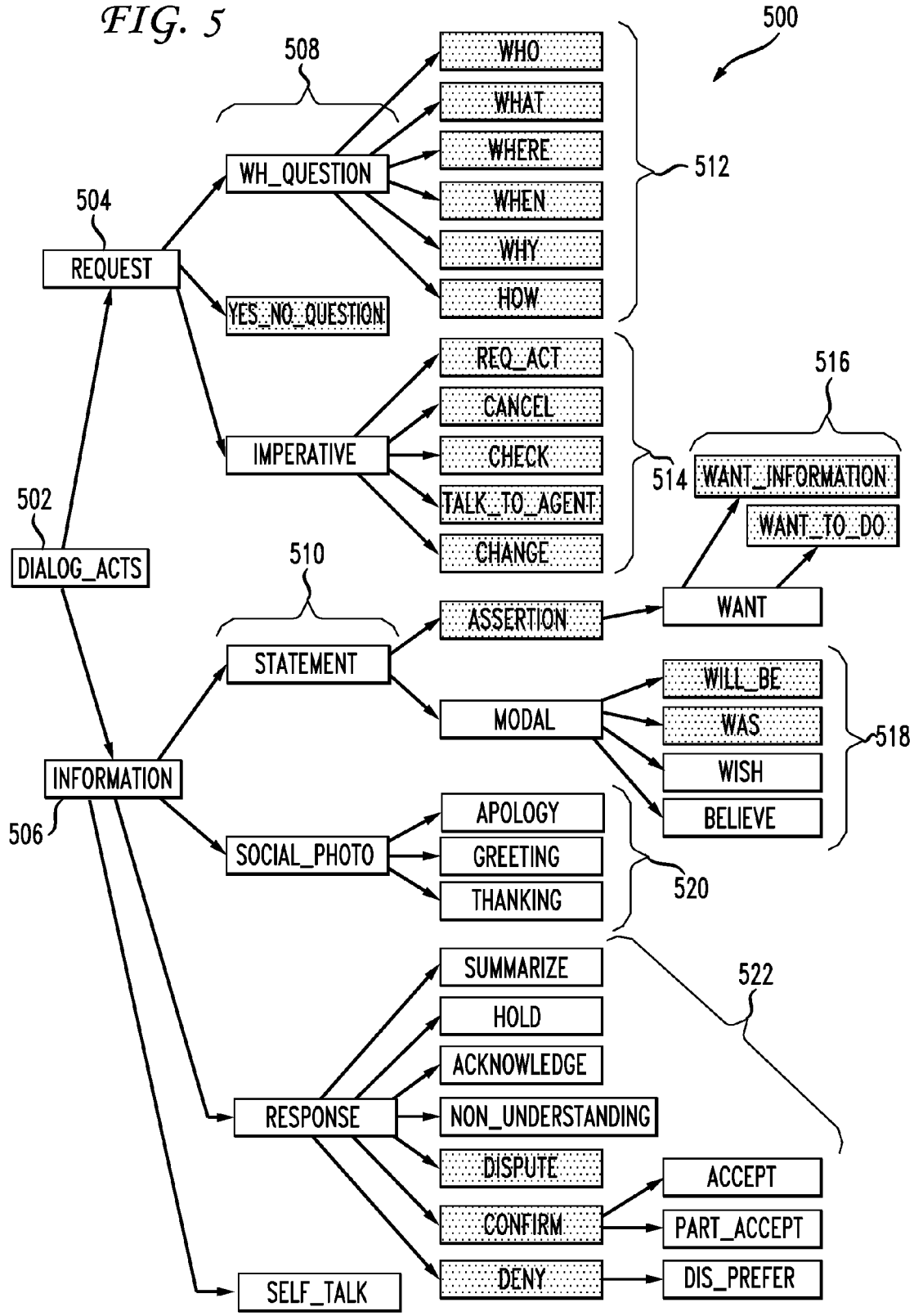
FIG. 5 illustrates an example dialog act taxonomy.

The system tags dialog acts associated with the received source speech signal using a classification model (such as a maximum entropy model), dialog acts being domain independent descriptions of an intended action a speaker carries out by uttering the source speech signal (204). The principle of maximum entropy states that when only partial information about the probabilities of possible outcomes is available, the system should choose probabilities so as to maximize the uncertainty about the missing information. In other words, since entropy is a measure of randomness, the system should choose the most random distribution subject to applicable constraints. A dialog act is a domain independent description of the action a person carries out by uttering a clause. A sample dialog act taxonomy is shown in FIG. 5. Different dialog systems can categorize, store, and treat dialog acts differently. Some broad categories of dialog acts tags are yes/no question, statement, command, and who/what/when/where/why question. Following is an example dialog between two individuals including dialog act tags in parentheses: P1: "Hello." (greeting_semi_formal). P2: "Hi." (greeting_informal). P1: "Do you know where the gym is?" (yes_no_question, question_about_location). P2: "Yes, the gym is three blocks south of here on the corner of Fun Street and Fly Street." (positive_response, location_information). P1: "Thank you very much." (gratitude). P2: "No problem. Good luck!" (valediction, polite_good_wishes).

The system can group tags into sets reflecting the general category of dialog act rather than specific tags, such as statement, acknowledgement, abandoned, agreement, question, appreciation, and "other". The system can annotate tagged dialog acts to add commentary, notes, or explanations describing the dialog acts, the context giving rise to the dialog acts, the reasoning behind a classification of the dialog act into a particular set, or what categories of dialog act to expect in response.

The system produces an enriched hypothesis of the source speech signal incorporating the tagged dialog acts (206). As an example, when translating a source speech signal enriched with a dialog act tag indicating that the source is a question from English to Russian, because the source is English, the question is phrased in a very word order specific way. When translating to Russian, the word order is not as important as the indication that the source speech signal is a question. The system can rearrange word order so the translation sounds more "native" in Russian, while still retaining the quality and intonation of being a question. For example, an unmodified, word-for-word translation of the English sentence "We don't need your help" sounds incorrect in Russian. A proper translation, "Ваша помошь нам не нужна" (word-for-word "your help to us not necessary"), is in a different word order entirely. Dialog act tags can function as a type of metadata to retain meaning, quality, and intonation. Similar issues arise in different languages with different word orders, grammars, and intonations for various dialog acts. Then the system outputs a version of the enriched hypothesis translated into a target language (208).

When the source speech signal is a dialog turn having multiple sentences, the system reacts in a similar manner to that described above. The system can segment the source speech signal, tag dialog acts in each segment using a maximum entropy model, and produce an enriched translation of each segment in a target language incorporated the dialog act tags.

Figure 3:
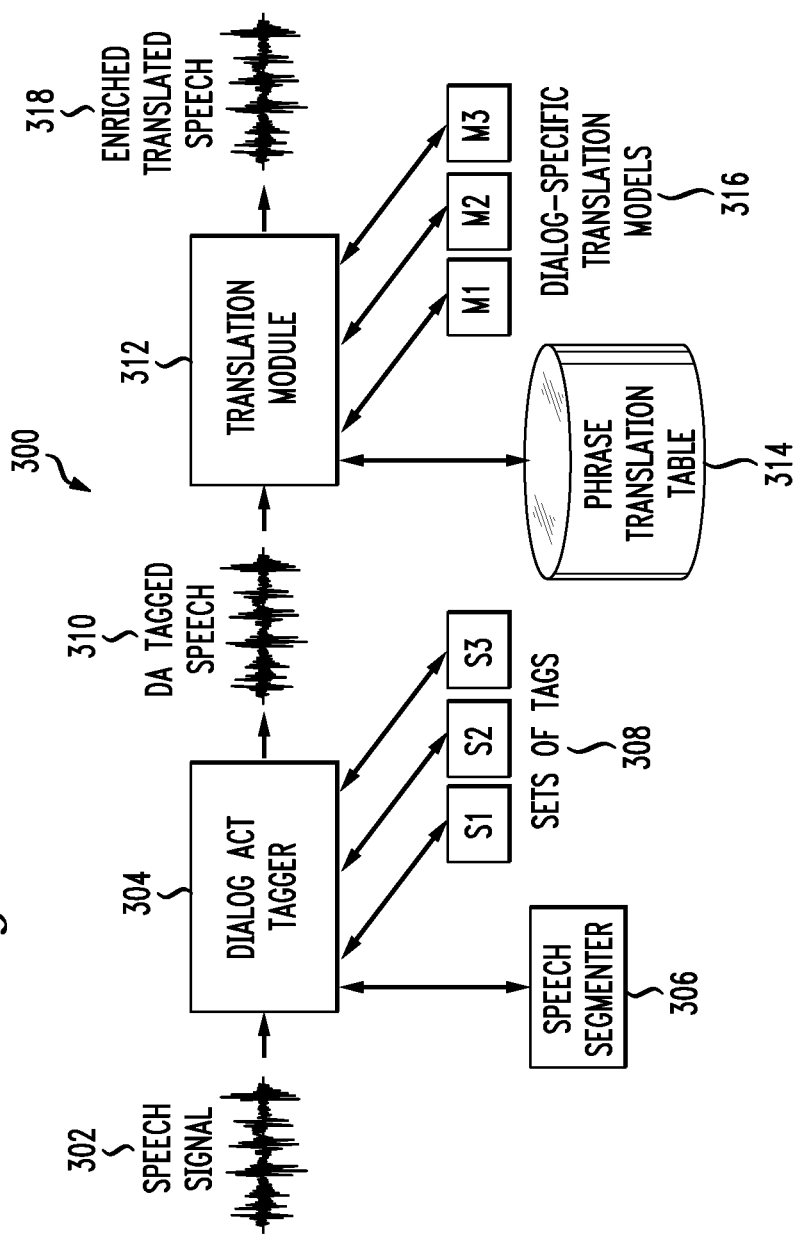
FIG. 3 illustrates an example system for translating speech using dialog act tags.

FIG. 3 illustrates an example system for translating speech using dialog act tags 300. A dialog act tagger 304 accepts an incoming speech signal 302. If the tagger 304 realizes that the speech signal has multiple sentences or multiple dialog acts, a speech segmenter 306 splits the speech into discrete sentences or into discrete dialog acts. The tagger 304 then analyzes each sentence or dialog act and can classify them into sets of tags 308 based on the categories described above, such as statement, acknowledgement, abandoned, agreement, question, appreciation, etc. The tagger 304 outputs enriched, dialog-act-tagged speech 310, sending it to a translation module 312 capable of understanding and incorporating the additional dialog act tag enriched speech 310. A phrase translation table 314 can assist the translation module 312 in translating the enriched speech 310. Further, dialog act specific translation models 316 can generate hypotheses that are more accurate with sufficient training data than without the use of dialog acts. The translation module 312 then converts the enriched speech 310 to enriched translated speech 318 in a language other than the original speech signal 302. For example, the original speech signal 302 can be French and the translation module 312 can output the enriched translated speech 318 in Hindi. In one example, not shown, a single dialog act tagger 304 connects to multiple translation modules 312, each capable of translating into a different language. In another example, a single translation module contains multiple plug-in modules which translate the speech signal 302 to multiple different languages. The system can output actual speech 318 or the system can output a set of instructions for reproducing speech, such as a lossless or lossy digital audio file or a Speech Synthesis Markup Language (SSML) file.

The system can directly exploit dialog act tags in statistical speech translation. At least two speech translation frameworks exist for exploiting dialog act tags. One is a standard phrase based statistical translation system and a second is a global lexical selection and reordering approach based on translating the source utterance into a bag-of-words (BOW). A maximum entropy dialog act tagger provides dialog act tags in accordance with the principles described herein. The dialog act tagger can be trained using a speech corpus such as the Switchboard Dialog Act Markup in Several Layers (DAMSL) corpus. The framework described herein is particularly suited for human-human and human-computer interactions in a dialog setting, where a correct understanding and application of an appropriate dialog act can compensate to some extent for information loss due to erroneous content. The system can use dialog acts to impart correct utterance level intonation during speech synthesis in the target language.

FIG. 4 illustrates an example of speech translation output enriched with a dialog act. FIG. 4 shows one example situation where the detection and transfer of dialog act information is beneficial. The source is an Arabic language sentence asking "Is this a painkiller?". The English language reference, or optimal translation, is "Is this a painkiller?" but the direct English translation hypothesis is "This is a painkiller." The direct translation hypothesis is a literal word for word translation and loses the sense of asking a question in English. An enriched hypothesis provides the text "this is a painkiller" and tags the phrase as a dialog act of a "Yes-No-Question". The system can incorporate dialog act tags in an enriched hypothesis to add appropriate intonation and change word order in the English language output to sound like a question. Under ideal circumstances, the system outputs a question in English that substantially matches the reference translation, "Is this a painkiller?"

Before describing the dialog act qualification process, more explanation and examples of dialog acts are provided. A dialog act is a domain independent description of the action a person carries out by uttering a clause. FIG. 5 shows a taxonomical hierarchy of dialog acts 500 that people perform while interacting with machines. At the top level, a clause, DIALOG_ACT 502, can be classified either as INFORMATION 506 (those that simply provide some information) or as REQUEST 504 (those that request for some information or some action to be done). These top-level dialog acts can be further sub-classified as shown in FIG. 5. For example, the dialog act of REQUEST 504 may have sub-classifications 508. The sub-classifications 508 can include a WH_QUESTION DA with further sub-classifications 512, such as WHO, WHAT, WHERE, WHEN, WHY, HOW types of "WH" questions. Other sub-classifications are shown for a REQUEST 504 DA, such as a YES-NO-QUESTION and an IMPERATIVE DA. FIG. 5 further shows another layer of sub-classifications 514 for IMPERATIVE as REQ_ACT, CANCEL, CHECK, TALK_TO_AGENT, and CHANGE 514. Of these, the REQ-ACT DA is the most general one and is assigned to the clauses embodying a request for an action to be performed. Others are special cases of REQ_ACT where the actions requested are to cancel something, check for something, transfer to an agent, and to change something, etc.

Similarly, the INFORMATION DA 506 in FIG. 5 can also have sub-classifications 510, such as STATEMENT, SOCIAL_PHOTO, RESPONSE, and SELF-TALK. The STATEMENT DA is assigned to clauses where a person simply makes a statement, i.e., is not asking a question or requesting an action to be performed. Such statements could be either simple assertion of facts or contain some kind of modality. Accordingly STATEMENT DA can be sub-classified as ASSERTION or MODAL. The sub-hierarchy shown as 516 sub-classifies the ASSERTION DA. For example e.g. a person may make an assertion that she want to do something or wants to find out some things. These DA are labeled as WANT-TO-DO and WANT-INFORMATION, as shown in 516. The sub-hierarchy shown as 518 further refines the MODAL sub-classification of STATEMENT 510, where a person may predict something for the future: WILL_BE, or the person may state something that happened in the past WAS, or the person may express a desire: WISH, or a belief: BELIEVE. The SOCIAL_PHOTO DA is assigned to phrases uttered to perform some social protocol. The sub-hierarchy shown as 520 further refines the SOCIAL_PHOTO DA. The RESPONSE DA is assigned to phrases uttered to respond to a question. The sub-hierarchy shown as 522 further refines the RESPONSE DA.

The exemplary dialog act taxonomy shown in FIG. 5 is provided for illustrative purposes only. The system can add other dialog acts to this taxonomy, refine it even further, or select a restricted set of dialog acts from this taxonomy itself depending on the level of understanding desired. For example the shaded nodes in FIG. 5 show a possible set of dialog acts that a specific dialog system may wish to identify.

The system can associate dialog acts (DA) with each clause to assist in understanding user utterances qualifiedly. For example, the DA of WANT-INFORMATION can be qualified with the description of information desired; IMPERATIVE can be qualified with the action that is ordered. While dialog acts are domain-independent, their qualification involves domain-dependent objects and actions referred to in the clause. For example, the clause "Can you tell me where Zardoz is playing?" contains a dialog act of type WHERE indicating to the DM that it should find out the place associated with something. A dialog manager however also needs further qualification of the WHERE DA in that it must know the domain-dependent thing whose place it must find out. In this example, it is "playing Zardoz." For more information and a more detailed discussion of dialog acts, see related U.S. Patent Application 20030130841.

The system uses a maximum entropy sequence tagging model for automatic dialog act tagging. The prediction problem can be modeled as a classification task: given a sequence of utterances U=$u_1, u_2, \ldots, u_n$ and a dialog act vocabulary ($d_i \in D$, $|D|=K$), the system must predict the best dialog act sequence D*=$d_1, d_2, \ldots, d_n$. The classifier assigns to each utterance a dialog act label conditioned on a vector of local contextual feature vectors comprising the lexical, syntactic and acoustic information.

The general problem of enriched statistical speech-to-speech translation can be summarized as follows. $S_s$, $T_s$ and $S_t$, $T_t$ are the speech signals and equivalent textual transcription in the source and target language, and $L_s$ is the enriched representation for the source speech. The speech to speech translation approach described herein can be formalized as follows:

$$S_t^* = \operatorname*{argmax}_{S_t} P(S_t \mid S_s) \qquad \text{Equation 1}$$

$$P(S_t \mid S_s) = \sum_{T_t, T_s, L_s} P(S_t, T_t, T_s, L_s \mid S_s) \qquad \text{Equation 2}$$

$$\approx \sum_{T_t, T_s, L_s} P(S_t \mid T_t, L_s) \cdot P(T_t, T_s, L_s \mid S_s) \qquad \text{Equation 3}$$

where conditional independence assumptions allow for Equation 3. Even though the system can perform recognition and translation jointly, typical speech-to-speech translation frameworks compartmentalize the automatic speech recognition, machine translation, and text to speech (TTS) and individually maximize each component for performance as follows:

$$S_t^* = \operatorname*{argmax}_{S_t} P(S_t \mid S_s) \approx \qquad \text{Equation 4}$$

$$\operatorname*{argmax}_{S_t} P(S_t \mid T_t^*, L_s^*) \times \operatorname*{argmax}_{T_t} P(T_t \mid T_s^*, L_s^*) \times$$

$$\operatorname*{argmax}_{L_s} P(L_s \mid T_s^*, S_s) \times \operatorname*{argmax}_{T_s} P(T_s \mid S_s)$$

where $T_s^*$, $T_t^*$, and $S_t^*$ are the arguments maximizing each of the individual components in the translation engine. $L_s^*$ is the rich annotation detected from the source speech signal and text, $S_s$ and $T_s^*$ respectively. The principles described herein can be combined with nearly any speech synthesis component. The rich annotations ($L_s$) can include one or more of syntactic or semantic concepts, prosody, and dialog act tags.

One scheme for statistical translation is the phrase based approach. An example phrase based approach obtains word-level alignments from a bilingual corpus using tools such as GIZA++ and extracts phrase translation pairs from the bilingual word alignment using heuristics. If the phrase based approach has access to source side dialog acts ($L_s$), the translation problem can be reformulated as:

$$T_t^* = \operatorname*{argmax}_{T_t} P(T_t \mid T_s, L_s) \qquad \text{Equation 5}$$

$$= \operatorname*{argmax}_{T_t} P(T_s \mid T_t, L_s) \cdot P(T_t \mid L_s)$$

The first term in Equation 5 corresponds to a dialog act specific machine translation model and the second term corresponds to a dialog act specific language model. Given a sufficient amount of training data, such a system can generate hypotheses that are more accurate than without the use of dialog acts.

The system can use a bag-of-words (BOW) approach for enriching translation which treats the target sentence as a BOW assigned to the source sentence and its corresponding dialog act tag. Given a source sentence and the dialog act tag, the objective is to estimate the probability of finding a given word in the target sentence. Because each word in the target vocabulary is detected independently, the system can use simple binary static classifiers. The classifier is trained with word n-grams and dialog act (BOW grams($T_s$), $L_s$) from the source sentence $T_s$. During decoding, the system considers words with conditional probability greater than a threshold $\Theta$ as the result of lexical choice decoding. The system can train the BOW lexical choice model using a binary maximum entropy technique with L1-regularization as follows:

$$\text{BOW}_{T_t}^* = \{T_t \mid P(T_t \mid \text{BOWgrams}(T_s), L_s) > \Theta\} \qquad \text{Equation 6}$$

The system considers all permutations of words in BOW; and weights them according to a target language model in order to reconstruct the correct order of words in the target sentence. The system controls the length of target sentences by either varying the parameter $\Theta$ or adding optional deletion arcs to the final step of the decoding process.

The system can use dialog acts which are predictions from a maximum entropy based dialog act tagger. Even without reference dialog act tags, the system can still achieve modest improvements in translation quality. Improvements to the dialog act tagger and suitable adaptation techniques can further enhance system performance.

The principles described herein are particularly suited for translation scenarios that do not involve multiple sentences as part of a turn, such as lectures or parliamentary addresses. However, this is not a strict limitation of the proposed work. The system can appropriately handle translation scenarios having multiple sentences in each turn by segmenting the utterances before using the dialog act tagger. For example, the system can segment a long dialog turn into paragraphs, sentences, or phrases.

Embodiments within the scope of the present invention may also include computer-readable media for carrying or having computer-executable instructions or data structures stored thereon. Such computer-readable media can be any available media that can be accessed by a general purpose or special purpose computer, including the functional design of any special purpose processor as discussed above. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, data structures, and functions inherent in the design of special-purpose processors that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the invention. For example, the principles herein may be applied to speech interpretation using Voice over IP (VoIP), interpretation of live broadcast events, handheld natural language interpretation devices, etc. Those skilled in the art will readily recognize various modifications and changes that may be made to the present invention without following the example embodiments and applications illustrated and described herein, and without departing from the true spirit and scope of the present invention.

We claim:

1. A method comprising:
   tagging, via a processor and using a maximum entropy classification model, dialog acts associated with a user utterance in a source natural spoken language, to yield dialog act tags, the dialog act tags being domain independent descriptions of an intended action of a speaker; and
   outputting, via the processor, an enriched version of a hypothesis translated into a target natural spoken language, to yield a translated speech output signal with a word order determined by the dialog act tags, wherein the enriched version of the hypothesis has a word order distinct from the hypothesis.

2. The method of claim 1, wherein the dialog acts are tagged using tags that are grouped into sets.

3. The method of claim 2, wherein each of the sets is associated with a dialog act category selected from a group consisting of a statement category, an acknowledgement category, an abandoned category, an agreement category, a question category, and an appreciation category.

4. The method of claim 1, wherein outputting the enriched version of the hypothesis uses a dialog act specific translation model comprising a phrase translation table.

5. The method of claim 4, further comprising:
   appending to each phrase translation table associated with a particular dialog act specific translation model those entries from a complete model that are not present in the phrase translation table of the dialog act specific translation model, to yield appended entries; and
   weighting the appended entries.

6. The method of claim 4, wherein the dialog act specific translation model is a bag-of-words translation model.

7. The method of claim 1, wherein the user utterance is part of a dialog turn having multiple sentences, the method further comprising:
   segmenting the user utterance, to yield segments;
   tagging second dialog acts in each segment of the segments using a maximum entropy model, to yield second tagged dialog acts; and
   producing an enriched hypothesis of each segment incorporating the second tagged dialog acts.

8. The method of claim 1, the method further comprising annotating tagged dialog acts.

9. A system comprising:
   a processor; and
   a computer-readable storage medium having instructions stored which, when executed by the processor, cause the processor to perform operations comprising:
      tagging dialog acts, using a maximum entropy classification model, associated with a user utterance in a source natural spoken language, to yield dialog act tags, the dialog act tags being domain independent descriptions of an intended action of a speaker; and
      outputting an enriched version of a hypothesis translated into a target natural spoken language, to yield a translated speech output signal with a word order determined by the dialog act tags, wherein the enriched version of the hypothesis has a word order distinct from the hypothesis.

10. The system of claim 9, wherein the dialog acts are tagged using tags that are grouped into sets.

11. The system of claim 10, wherein each of the sets is associated with a dialog act category selected from a group consisting of a statement category, an acknowledgement category, an abandoned category, an agreement category, a question category, and an appreciation category.

12. The system of claim 9, wherein outputting the enriched version of the hypothesis uses a dialog act specific translation model comprising a phrase translation table.

13. The system of claim 12, the computer-readable storage medium having additional instructions stored which, when executed by the processor, cause the processor to perform operations comprising:
appending to each phrase translation table associated with a particular dialog act specific translation model those entries from a complete model that are not present in the phrase translation table of the dialog act specific translation model, to yield appended entries; and
weighting the appended entries.

14. A non-transitory computer-readable storage device having instructions stored which, when executed by a computing device, cause the computing device to perform operation comprising:
tagging dialog acts, using a maximum entropy classification model, associated with a user utterance in a source natural spoken language, to yield dialog act tags, the dialog act tags being domain independent descriptions of an intended action of a speaker; and
outputting an enriched version of a hypothesis translated into a target natural spoken language, to yield a translated speech output signal with a word order determined by the dialog act tags, wherein the enriched version of the hypothesis has a word order distinct from the hypothesis.

15. The non-transitory computer-readable storage device of claim 14, wherein the user utterance is part of a dialog turn having multiple sentences, having additional instructions stored which, when executed by the computing device, cause the computing device to perform operations comprising:
segmenting the user utterance, to yield segments;
tagging second dialog acts in each segment of the segments using a maximum entropy model, to yield second tagged dialog acts; and
producing an enriched hypothesis of each segment incorporating the second tagged dialog acts.

16. The non-transitory computer-readable storage device of claim 14, having additional instruction stored which, when executed by the computing device, cause the computing device to perform operations comprising annotating tagged dialog acts.

* * * * *